US011478080B2

(12) United States Patent
Briosi

(10) Patent No.: US 11,478,080 B2
(45) Date of Patent: Oct. 25, 2022

(54) BEARING STRUCTURE FOR SHELVING

(71) Applicant: Antonello Briosi, Rovereto (IT)

(72) Inventor: Antonello Briosi, Rovereto (IT)

( * ) Notice: Subject to any disclaimer, the term of this patent is extended or adjusted under 35 U.S.C. 154(b) by 245 days.

(21) Appl. No.: 16/753,250

(22) PCT Filed: Oct. 5, 2018

(86) PCT No.: PCT/IB2018/057756
§ 371 (c)(1),
(2) Date: Apr. 2, 2020

(87) PCT Pub. No.: WO2019/069284
PCT Pub. Date: Apr. 11, 2019

(65) Prior Publication Data

US 2020/0305597 A1 Oct. 1, 2020

(30) Foreign Application Priority Data

Oct. 5, 2017 (IT) ........................ 102017000111683

(51) Int. Cl.
*A47B 57/40* (2006.01)
*A47B 47/00* (2006.01)
(Continued)

(52) U.S. Cl.
CPC ........ *A47B 57/402* (2013.01); *A47B 47/0058* (2013.01); *A47B 47/021* (2013.01);
(Continued)

(58) Field of Classification Search
CPC .......... F16B 12/32; F16B 12/34; F16B 12/40; F16B 12/50; A47B 96/1441;
(Continued)

(56) References Cited

U.S. PATENT DOCUMENTS 2,261,956 A * 11/1941 Brownlie ............... A47B 57/40 182/228.3
2,925,920 A * 2/1960 Skubic ................ A47B 57/402 108/107

(Continued)

FOREIGN PATENT DOCUMENTS

DE 20110964 U1 5/2002
EP 0934713 A1 8/1999

*Primary Examiner* — Patrick D Hawn
(74) *Attorney, Agent, or Firm* — David B. Tingey; Bryant J. Keller; Kirton McConkie

(57) ABSTRACT

The bearing structure for shelving comprises: —a vertical upright comprising a first metal section provided with at least a first longitudinal side and with at least a second longitudinal side, the first longitudinal side and the second longitudinal side being flat, continuous and transverse to each other; —a longitudinal cross-piece; —an angular bracket to be interposed between the vertical upright and the longitudinal cross-piece and comprising a first longitudinal face and a second longitudinal face, the first longitudinal face and the second longitudinal face being flat, contiguous and transverse to each other; wherein it comprises first connecting means arranged on the first longitudinal side and the first longitudinal face, and second connecting means, arranged on the second longitudinal side and the second longitudinal face, the first connecting means and the second connecting means coupling the angular bracket to the vertical upright.

7 Claims, 8 Drawing Sheets

(51) Int. Cl.
*A47B 47/02* (2006.01)
*A47B 96/14* (2006.01)
*F16B 12/50* (2006.01)
*F16B 12/40* (2006.01)
*F16B 12/32* (2006.01)
*F16B 12/34* (2006.01)

(52) U.S. Cl.
CPC .......... *A47B 96/1441* (2013.01); *F16B 12/32* (2013.01); *F16B 12/34* (2013.01); *F16B 12/40* (2013.01); *F16B 12/50* (2013.01)

(58) Field of Classification Search
CPC . A47B 47/0058; A47B 47/021; A47B 57/402; A47B 57/30; A47B 57/32; A47B 57/34; A47B 57/40; A47B 57/404; A47B 57/406
See application file for complete search history.

(56) References Cited

U.S. PATENT DOCUMENTS 2,937,767 A * 5/1960 Butler .................. A47B 47/021 211/187
3,009,582 A * 11/1961 Degener .............. A47B 57/402 211/134
3,273,720 A * 9/1966 Seiz ..................... A47B 57/402 108/107
3,510,010 A * 5/1970 Gasner ...................... F16B 7/22 248/248
3,788,490 A * 1/1974 Featherman ......... A47B 57/402 211/191
3,871,525 A * 3/1975 Al-Dabbagh ........ A47B 57/402 211/206
4,154,419 A * 5/1979 Breidenbach ........ A47B 57/402 211/187
4,342,397 A * 8/1982 Halstrick ............. A47B 57/402 403/231
4,513,669 A * 4/1985 Steinke .................. A47B 57/48 108/107
4,928,834 A * 5/1990 Neiman ............... A47B 57/402 211/208
5,036,778 A * 8/1991 Briosi .................. A47B 57/406 211/187
5,377,851 A * 1/1995 Asano .................. A47B 57/402 211/192
9,375,102 B2 * 6/2016 Troyner .................... A47F 5/01
9,661,921 B1 * 5/2017 Tsai ....................... A47B 57/50
10,368,639 B1 * 8/2019 Lai ......................... A47B 95/00
10,610,017 B2 * 4/2020 Beadle ............... A47B 47/0058
11,026,509 B2 * 6/2021 Walker ............... A47B 96/1416
11,202,502 B1 * 12/2021 Berry ................. A47B 47/0083
11,219,308 B2 * 1/2022 Globerman .......... A47B 57/406
2002/0153341 A1 * 10/2002 May ..................... A47B 57/402 211/208
2008/0302747 A1 * 12/2008 Nance ..................... F16B 12/28 211/183
2012/0000871 A1 1/2012 Troyner et al.
2014/0116973 A1 * 5/2014 Buckley ............... A47B 96/021 29/525.01
2014/0138503 A1 * 5/2014 Consaul ................. A47B 97/00 248/214
2017/0238710 A1 * 8/2017 Tsai ....................... A47B 57/34
2020/0305597 A1 * 10/2020 Briosi .................. A47B 57/402
2020/0323341 A1 * 10/2020 Briosi .................... A47B 88/43

* cited by examiner 1
2
3
4
5
6
7
10
11
12
13
16
18
19
23
24
27
28
29
30
31
32

2
5
33
1
19
18
5
23
3
7
28
16
30
27
29
4
31
28
18
32
30
10
27
24
6
19
24
16
7
28
27
6
29
31
16
28
32
23
30
4
27
24

BEARING STRUCTURE FOR SHELVING

TECHNICAL FIELD

The present invention relates to a bearing structure for shelving.

BACKGROUND ART

Various bearing structures for shelving are known which stand out for their assembly techniques, the degree of modularity of the structure and the maximum capacity of the shelving made.

Structures of known type employ vertical uprights as a support base on a stable surface and longitudinal cross-pieces whereon a plurality of horizontal walkways rest thereby forming a plurality of tops of the shelving.

Furthermore, known bearing structures are used both in the domestic and commercial sectors to preserve, display and/or store products of various kinds, the volume, weight and dimensions of which can vary considerably depending on the nature of the product itself.

For this reason, known bearing structures use attachment systems adapted to attach different types of uprights and cross-pieces to form a bearing structure of modular type adapted to accommodate different products according to the user's needs.

Several attachment systems are known which differ in shape and size depending on how the bearing structures are to be used.

Generally, known types of attachment systems comprise angular brackets to attach at least one upright to at least one cross-piece in order to enable the bearing structure to sustain particularly heavy loads.

More specifically, the attachment systems used by known bearing structures comprise first connecting means adapted to attach the body of the angular bracket to the body of the upright and second connecting means adapted to attach the body of the cross-piece to the body of the angular bracket.

This way, the first connecting means and the second connecting means are specifically designed to distribute the load from the cross-piece to the upright through the body of the angular bracket and increase the maximum load that can be tolerated by the bearing structure.

However, known bearing structures are susceptible to upgrading with regard to the attachment systems used to attach together uprights and cross-pieces.

In fact, the first connecting means generally comprise a plurality of recesses made on the body of the upright and a plurality of attachment portions, made on the body of the angular bracket and adapted to couple with the relative recesses to attach the angular bracket to the upright.

More specifically, the upright generally comprises a flat longitudinal side on which the recesses are made and the angular bracket generally comprises a flat longitudinal face on which the interlocking portions are made.

This way, the angular bracket is attached to the upright along a single attachment plane, i.e. that defined by the longitudinal side and by the longitudinal face, which, however, does not always ensure the best distribution of the load between the cross-piece and the upright.

Furthermore, in known bearing structures, the recesses are designed with a single shape and size and are repeated along the body of the upright to provide the necessary attachment points for the construction of the structure itself.

However, the load transmitted between the cross-piece and the upright is generally composed of a longitudinal compression component, which pushes the angular bracket longitudinally along the body of the upright, and a transverse torsion component that tends to rotate the angular bracket around the body of the upright.

For this reason, the single shape of the recesses and the corresponding attachment portions proposed by known bearing structures does not always permit correctly distributing the longitudinal component and the transversal component of the load.

An incorrect load distribution of the attachment systems significantly compromises the stability and the maximum load supported by the bearing structure, with the risk of considerably restricting the sales market.

DESCRIPTION OF THE INVENTION

The main aim of the present invention is to devise a bearing structure for shelving that allows attaching the angular bracket to the vertical upright so as to maximize the load tolerable by the bearing structure.

A further object of the present invention is to devise a bearing structure for shelving that allows correctly distributing both the longitudinal component and the transverse component which compose the load applied on the bearing structure.

Another object of the present invention is to devise a bearing structure for shelving, which allows overcoming the aforementioned drawbacks of the prior art within the scope of a simple, rational, easy, efficient to use and cost-effective solution.

The aforementioned objects are achieved by the present bearing structure for shelving having the characteristics of claim 1.

BRIEF DESCRIPTION OF THE DRAWINGS

Other characteristics and advantages of the present invention will become more evident from the description of a preferred, but not exclusive embodiment of a bearing structure for shelving, illustrated by way of an indicative, but non-limiting example, in the attached drawings in which.

EMBODIMENTS OF THE INVENTION

Figure 1:
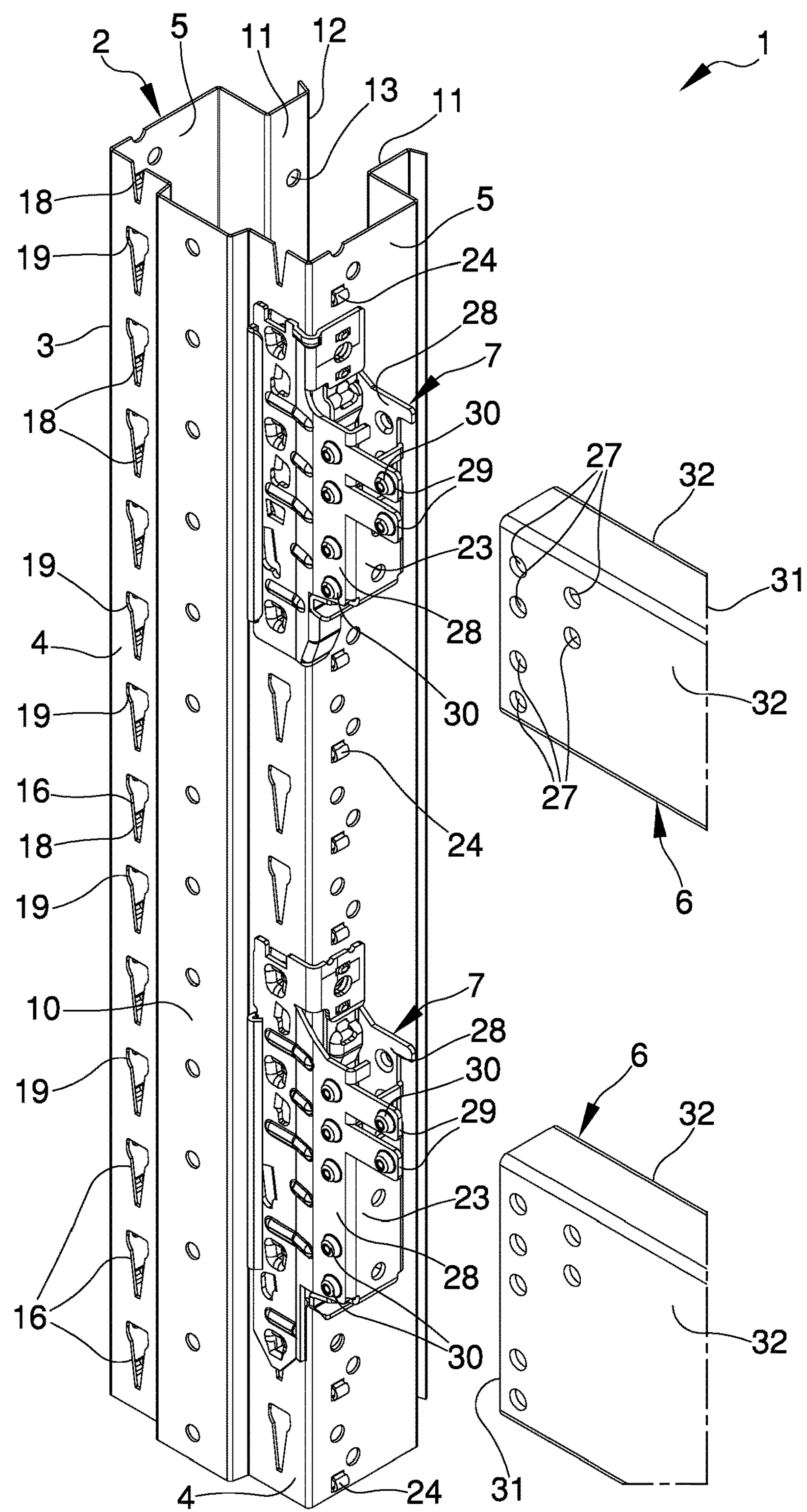
FIG. 1 is an axonometric view of a first embodiment of the bearing structure for shelving according to the invention.

With particular reference to these figures, reference numeral 1 globally indicates a bearing structure for shelving.

The bearing structure 1 for shelving comprises:

at least a vertical upright 2 comprising at least a first metal section 3 provided with at least a first longitudinal side 4 and with at least a second longitudinal side 5, the first longitudinal side 4 and the second longitudinal side 5 being flat, continuous and transverse to each other;

at least a longitudinal cross-piece 6;

at least an angular bracket 7 to be interposed between the vertical upright 2 and the longitudinal cross-piece 6 and comprising at least a first longitudinal face 8 and at least a second longitudinal face 9, the first longitudinal face 8 and the second longitudinal face 9 being flat, contiguous and transverse to each other.

Figures 6, 7:
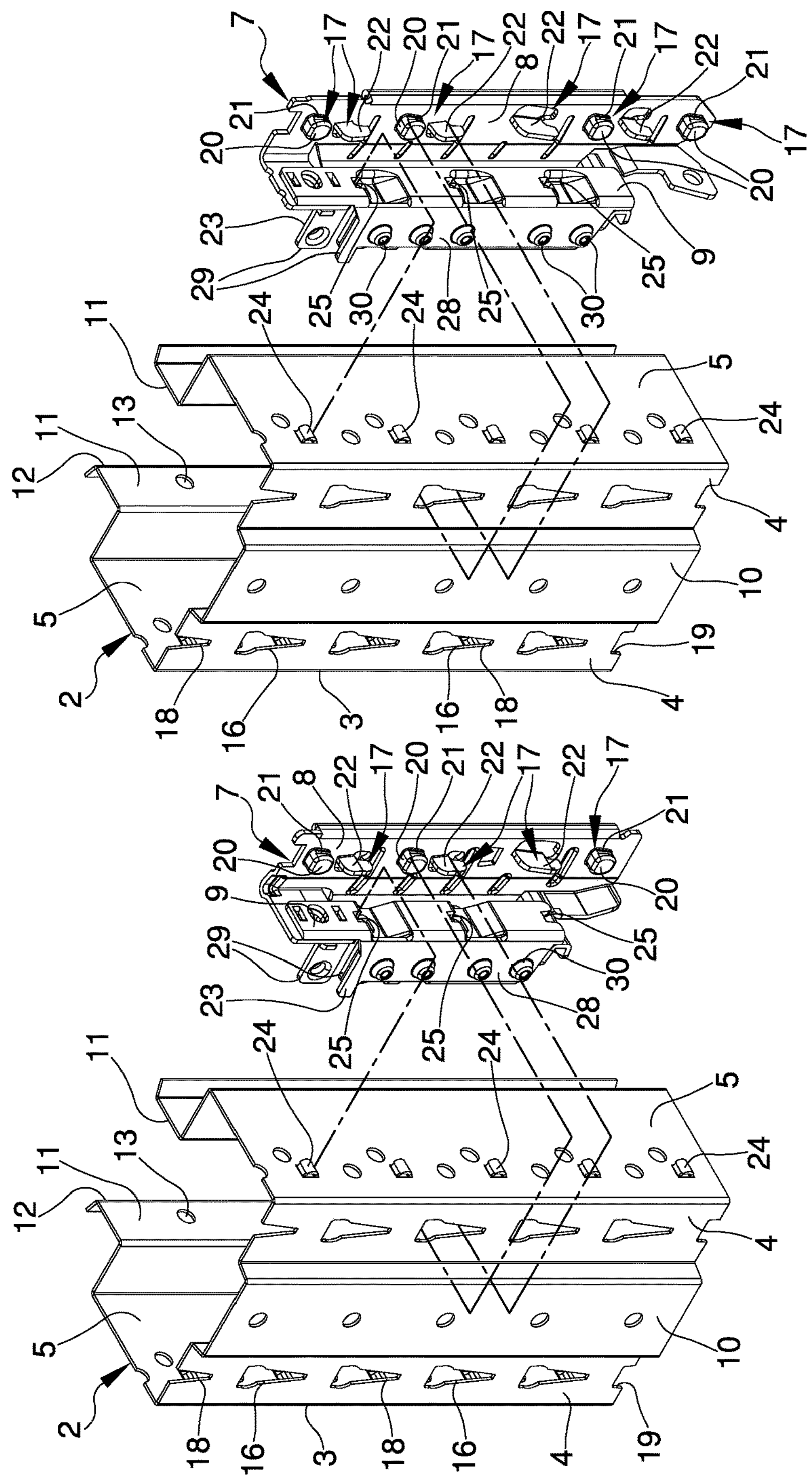
FIG. 6 is an axonometric view showing the coupling of the component of FIG. 2 with the upright of the bearing structure of FIG. 1.
FIG. 7 is an axonometric view showing the coupling of the component of FIG. 4 with the upright of the bearing structure of FIG. 1.

Advantageously, in a first embodiment shown in FIGS. 1, 6 and 7, the first metal section 3 has an open shape.

Specifically, the vertical uprights 2 comprise a pair of first longitudinal sides 4 arranged substantially coplanar with each other to form a substantially flat front side 10 and a pair of second longitudinal sides 5 arranged substantially opposed and parallel to each other to form with the first longitudinal sides 4 the first metal section 3 having a substantially "C" shape.

Advantageously, the first metal section 3 also comprises a pair of third longitudinal sides 11, each of which arranged substantially continuous to a corresponding second longitudinal side 5 and substantially orthogonal to the first longitudinal sides 4 to define a longitudinal opening 12.

Moreover, the first metal section 3 comprises fixing means 13 formed along the third longitudinal sides 11 and associable with at least one supporting element not shown in the figures.

Preferably, the structure 1 comprises a plurality of vertical uprights 2 arranged resting on a stable surface, e.g., on the ground, so as to extend longitudinally in height to form a basic structure to which the components of the bearing structure 1 are attached.

In the remainder of the discussion, with reference to the conditions in which the vertical upright 2 is arranged resting on a stable surface, the terms "upper" and "lower", as well as the terms "top" and "bottom", are used to define the mutual position of several components in which one component is defined as "upper" or "lower" relative to another if arranged at a greater or less distance from the stable surface.

Advantageously, the third longitudinal sides 11 of two vertical uprights 2 can be attached to the ends of one or more longitudinal reinforcements respectively (not shown in the illustration) by means of the fixing means 13.

This way, braced facades can be created which increase the stability and the maximum load sustainable by the structure 1.

Conveniently, the bearing structure 1 comprises first connecting means 16, 17, arranged on the first longitudinal side 4 and on the first longitudinal face 8, and second connecting means 24, 25, arranged on the second longitudinal side 5 and on the second longitudinal face 9, the first connecting means 16, 17 and the second connecting means 24, 25 coupling the angular bracket 7 to the vertical upright 2.

Advantageously, also the first longitudinal face 8 and the second longitudinal face 9 of the angular brackets 7 are arranged substantially contiguous and orthogonal to each other to form a surface similar to that formed between a first longitudinal side 4 and a second longitudinal side 5.

This way, when the first longitudinal face 8 faces the first longitudinal side 4, also the second longitudinal face 9 faces the second longitudinal side 5 and vice versa.

Advantageously, the first connecting means 16, 17 comprise a plurality of first recesses 16, formed on one of the first longitudinal side 4 and the first longitudinal face 8, and a plurality of first attachment portions 17 attachable to the first recesses 16 and formed on the other of the first longitudinal side 4 and the first longitudinal face 8.

Specifically, the first recesses 16 are made aligned one on top of the other substantially along the entire length of each first longitudinal side 4 and, like the first recesses 16, the first attachment portions 17 are made aligned one on top of the other substantially along the entire length of the first longitudinal face 8.

Preferably, the first recesses 16 comprise at least one expanded portion 19 and at least one restricted portion 18, each of the first attachment portions 17 being attachable to at least one of the expanded portion 19 and the restricted portion 18. Specifically, the first recess 16 substantially has an isosceles triangular shape, of which the restricted portion 18 substantially defines the lower portion and the expanded portion 19 substantially defines the upper portion.

In greater detail, the restricted portion 18 defines an elongated contour that progressively narrows downwards until it closes at the vertex of the triangle and the expanded portion 19 defines a contour of substantially isosceles trapezoid shape, contiguous to that formed by the restricted portion 18 and closed at the base of the triangle.

Advantageously, at least one of the first attachment portions 17 comprises at least a first attachment element 20 attachable to the expanded portion 19.

Preferably, the first attachment element 20 is a protrusion having a substantially trapezoid shape section, formed on the first longitudinal face 8 and having two lateral grooves 21 substantially opposed and parallel to each other.

Conveniently, at least one of the first attachment portions 17 comprises at least a second attachment element 22 attachable to the restricted portion 18.

The second attachment element 22 is a sheet-like portion with a substantially curved shape, arranged protruding and substantially orthogonal to the first longitudinal face 8 to form a hook.

Conveniently, the second connecting means 24, 25 comprise a plurality of clamping portions 24, formed on one of the second longitudinal side 5 and the second longitudinal face 9, and a plurality of clamping seats 25 coupleable resting to the clamping portions 24 and formed on the other of the second longitudinal side 5 and the second longitudinal face 9.

The clamping portions 24 are made aligned one on top of the other substantially along the entire length of each second longitudinal side 5 and, in the same way, the clamping seats 25 are made aligned one on top of the other substantially along the entire length of the second longitudinal face 9.

Preferably, the clamping portions 24 are metal protrusions extending from the second longitudinal face 9 and the clamping seats 25 are recesses formed on the second longitudinal face 9 and having a shape substantially complementary to the shape of the clamping portions 24.

According to the invention, the bearing structure 1 for shelving comprises third connecting means 23, 27 to attach the angular bracket 7 to the longitudinal cross-piece 6, comprising at least a second recess 27 formed on one of the longitudinal cross-piece 6 and the angular bracket 7, and at least a second attachment portion 23, attachable to the second recesses 27 and formed on the other of the angular bracket 7 and the longitudinal cross-piece 6.

Appropriately, the second attachment portion 23 is associated with the angular bracket 7 on the opposite side of the second longitudinal face 9 and arranged substantially behind the clamping seats 25.

Furthermore, the clamping portion 24 comprises a pair of longitudinal attachment surfaces 28 arranged substantially orthogonal to the second longitudinal face 9 to extend in a substantially opposite direction to the first longitudinal face 8 and substantially opposed and parallel to each other.

Preferably, one of the attachment surfaces 28 comprises two longitudinal extensions 29 which extend parallel to each other as an extension of the attachment surface 28.

Conveniently, the attachment surfaces 28 comprise interlocking protrusions 30 with a substantially truncated-cone shape and arranged substantially orthogonal to the attachment surface 28.

Appropriately, the longitudinal cross-piece 6 comprises a second metal section 31 with a substantially rectangular shape and a pair of longitudinal stretches 32 substantially opposed and parallel to each other on which are formed a plurality of second recesses 27 respectively.

Furthermore, the distance between the longitudinal stretches 32 is substantially identical to the distance between the attachment surfaces 28 and the longitudinal cross-piece 6 is longitudinally hollow so as to allow insertion of the second attachment portion 23 of the angular bracket 7 inside the second metal section 31. Advantageously, the structure 1 provides for the use of different angular brackets 7 and longitudinal cross-pieces 6, as shown in FIG. 1, where the upper angular bracket 7 and longitudinal cross-piece 6 are substantially larger in shape and size than the lower angular bracket 7 and longitudinal cross-piece 6.

Specifically, the shape and size of the angular bracket 7 and longitudinal cross-piece 6 vary according to the characteristics of the first attachment portions 17 and of the third connecting means 23, 27.

Figure 3:
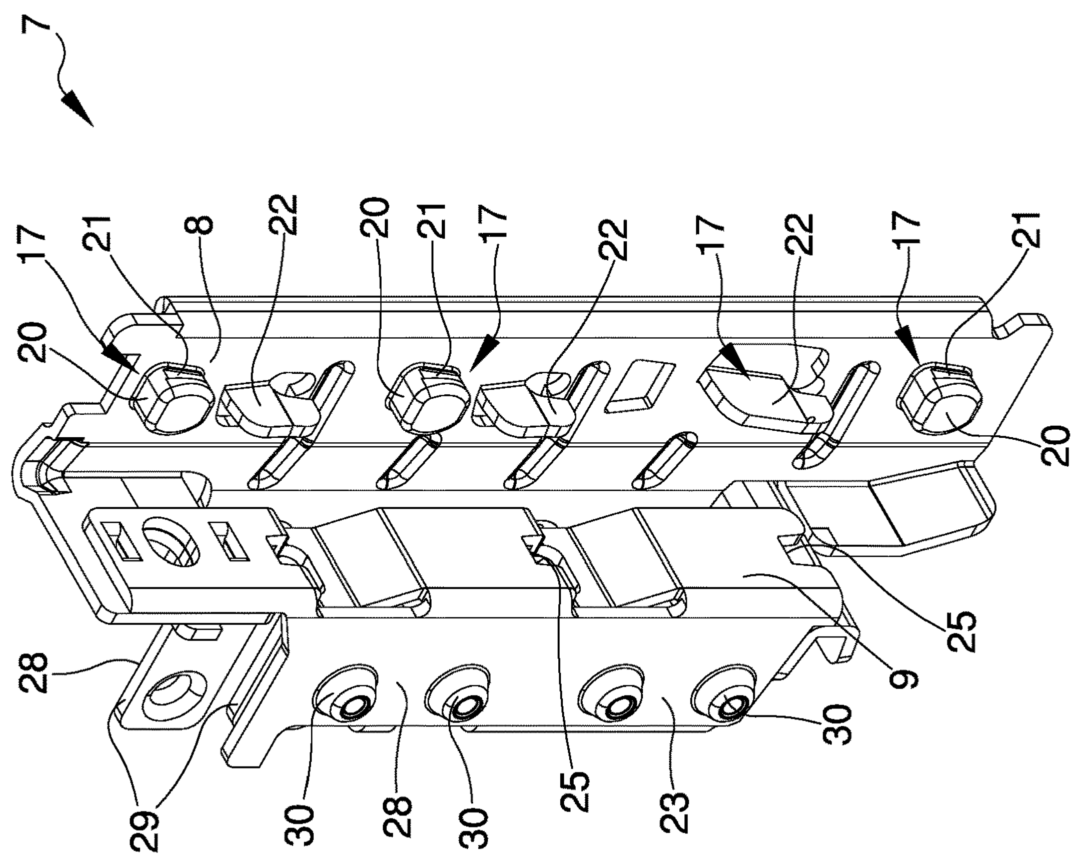
FIG. 3 is a view of the component shown in FIG. 2 rotated by 180°.
Figure 2:
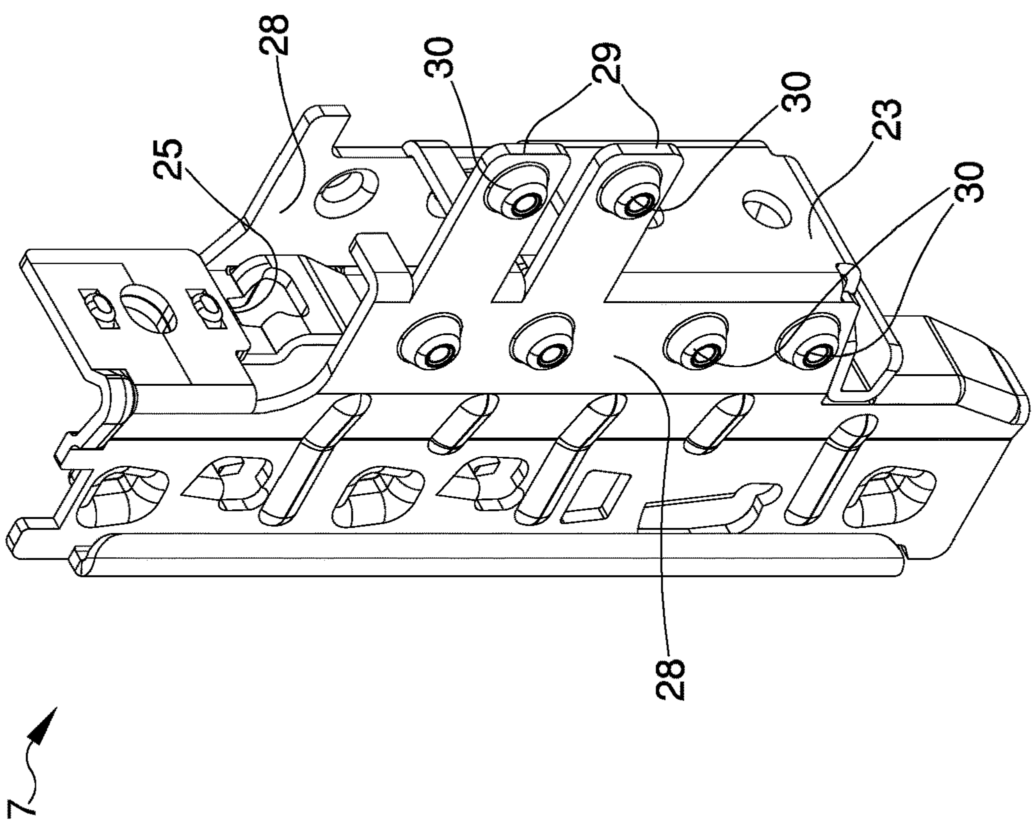
FIG. 2 is an axonometric view of a component of the bearing structure for shelving according to the invention.

For example, the upper angular bracket 7, shown in detail in FIG. 2 and in FIG. 3, comprises four first attachment portions 17 of which one comprises a single first attachment element 20, another comprises a single second attachment element 22 and the remaining two comprise a first attachment element 20 and a second attachment element 22 arranged substantially aligned one on top of the other.

Preferably, each attachment surface 28 of the angular bracket 7 just described comprises four interlocking protrusions 30 arranged aligned one on top of the other along the attachment surfaces 28.

Figure 5:
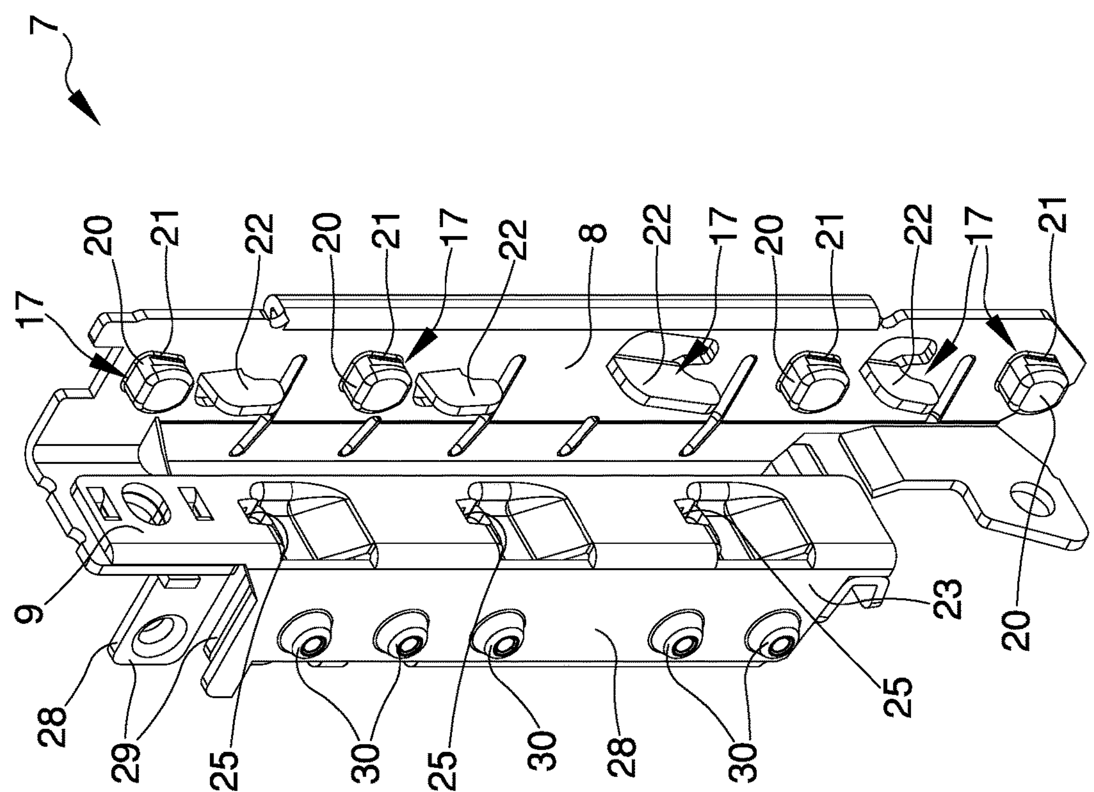
FIG. 5 is a view of the component shown in FIG. 4 rotated by 180°.
Figure 4:
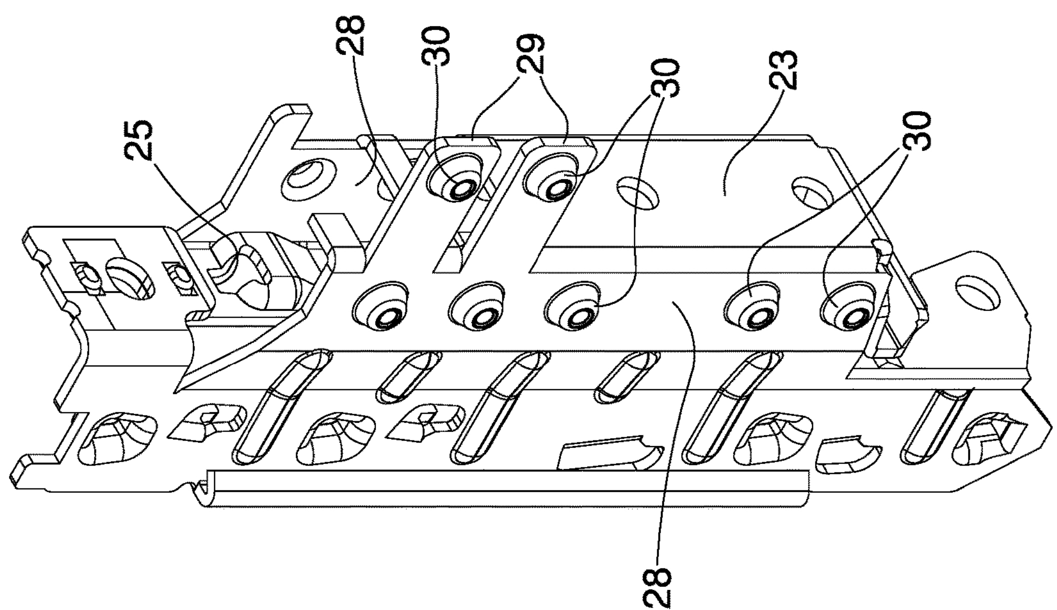
FIG. 4 is an axonometric view of another embodiment of the component shown in FIG. 2.

The lower angular bracket 7, on the other hand, shown in detail in FIG. 4 and FIG. 5, comprises five first attachment portions 17 of which one comprises a single first attachment element 20, another comprises a single second attachment element 22 and the remaining three comprise a first attachment element 20 and a second attachment element 22 arranged substantially aligned one on top of the other.

Preferably, each attachment surface 28 of the lower angular bracket 7 comprises five interlocking protrusions 30 arranged aligned one on top of the other along the attachment surfaces 28.

It should also be noticed that for both the angular brackets 7 just described, the size of a second attachment element 22 of a first attachment portion 17 which also comprises a first attachment element 20 is substantially smaller than the second attachment element 22 of a first attachment portion 17 which does not also comprise a first attachment element 20.

Furthermore, each extension 29 comprises a further interlocking protrusion 30.

Advantageously, the longitudinal stretches 32 of the longitudinal cross-pieces 6 comprise a number of second recesses 27 respectively equal to the number of interlocking protrusions 30 arranged on the attachment surfaces 28 to which they are to be attached.

Specifically, with reference to FIG. 1, the upper longitudinal cross-piece 6 comprises six second recesses 27 formed on a longitudinal stretch 32 and four second recesses 27 formed on the other longitudinal stretch 32.

The lower longitudinal cross-piece 6, instead, comprises seven second recesses 27 formed on a longitudinal stretch 32 and five formed on the other longitudinal stretch 32.

The operation of the invention according to the embodiment shown in FIGS. 1, 6 and 7 is as follows.

Conveniently, to attach the angular bracket 7 to the vertical upright 2, the first longitudinal face 8 and the second longitudinal face 9 are juxtaposed to the first longitudinal side 4 and to the second longitudinal side 5, respectively.

Specifically, during this operation, the first attachment portions 17 are inserted into the corresponding first recesses 16 and the clamping seats 25 are arranged in contact with the second longitudinal side 5 in the proximity of the corresponding clamping portions 24.

More specifically, the first attachment elements 20 are inserted inside the expanded portion 19 and the second attachment elements 22 are inserted inside the restricted portion 18.

Once this configuration has been reached, the angular bracket 7 is made to slide downwards, maintaining contact between the longitudinal faces 8, 9 and the longitudinal sides 4, 5.

This way, the lateral grooves 21 are guided, sliding along the portions of the first longitudinal side 4 which define the contour of the first recess 16, until they interlock in a prismatic manner along the contour of the restricted portion 18.

At the same time, the second attachment elements 22 reach the lower end of the restricted portion 18 so as to arrange themselves astride of the first recess 16 and through the first longitudinal side 4 so as to attach onto the first metal section 3.

In the same way, the clamping seats 25 slide along the second longitudinal side 5 until they are arranged resting against the corresponding clamping portions 24.

This way, the clamping seats 25 are coupled resting to the clamping portions 24 when the first attachment portions 17 are attached to the first recesses 16.

Consequently, when the angular bracket 7 undergoes a load, the clamping seats 25 press up against the clamping portions 24 in order to block the longitudinal sliding of the angular bracket 7 and distribute the longitudinal compression component of the load on the second longitudinal side 5.

At the same time, the first attachment portions 17 distribute the transverse torsion component of the load on the first longitudinal side 4.

In particular, the lateral grooves 21 of the first attachment element 20 lever on the sides of the first recess 16 and the second attachment element 22 levers on the lower end of the restricted portion 18.

Advantageously, to each single vertical upright 2 it is possible to attach a plurality of angular brackets 7 to which it is possible to attach one end of a longitudinal cross-piece 6.

More specifically, the second attachment portion 23 of the angular bracket 7 is inserted inside the second metal section 31 so as to arrange the attachment surfaces 28 facing the longitudinal stretches 32.

More in particular, the interlocking protrusions 30 are inserted into the corresponding second recesses 27 so as to pass through, from inside to outside, the second metal section 31.

Once this configuration has been reached, the interlocking protrusions 30 are stably coupled to the second recess 27 by means of a cold riveting process that allows attaching the longitudinal cross-piece 6 onto the angular bracket 7.

Figure 8:
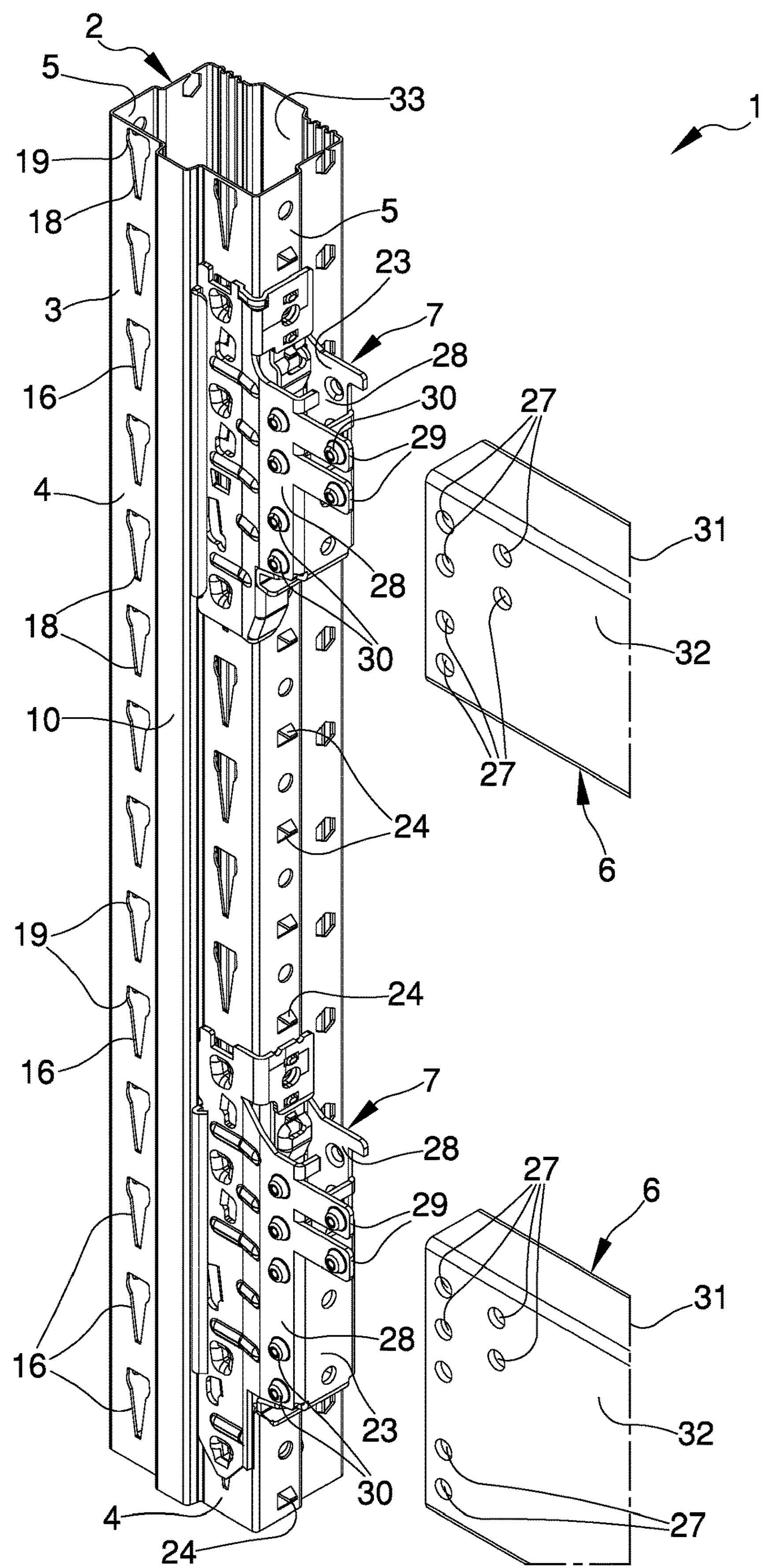
FIG. 8 is an axonometric view of a second embodiment of the bearing structure for shelving according to the invention.
Figures 9, 10:
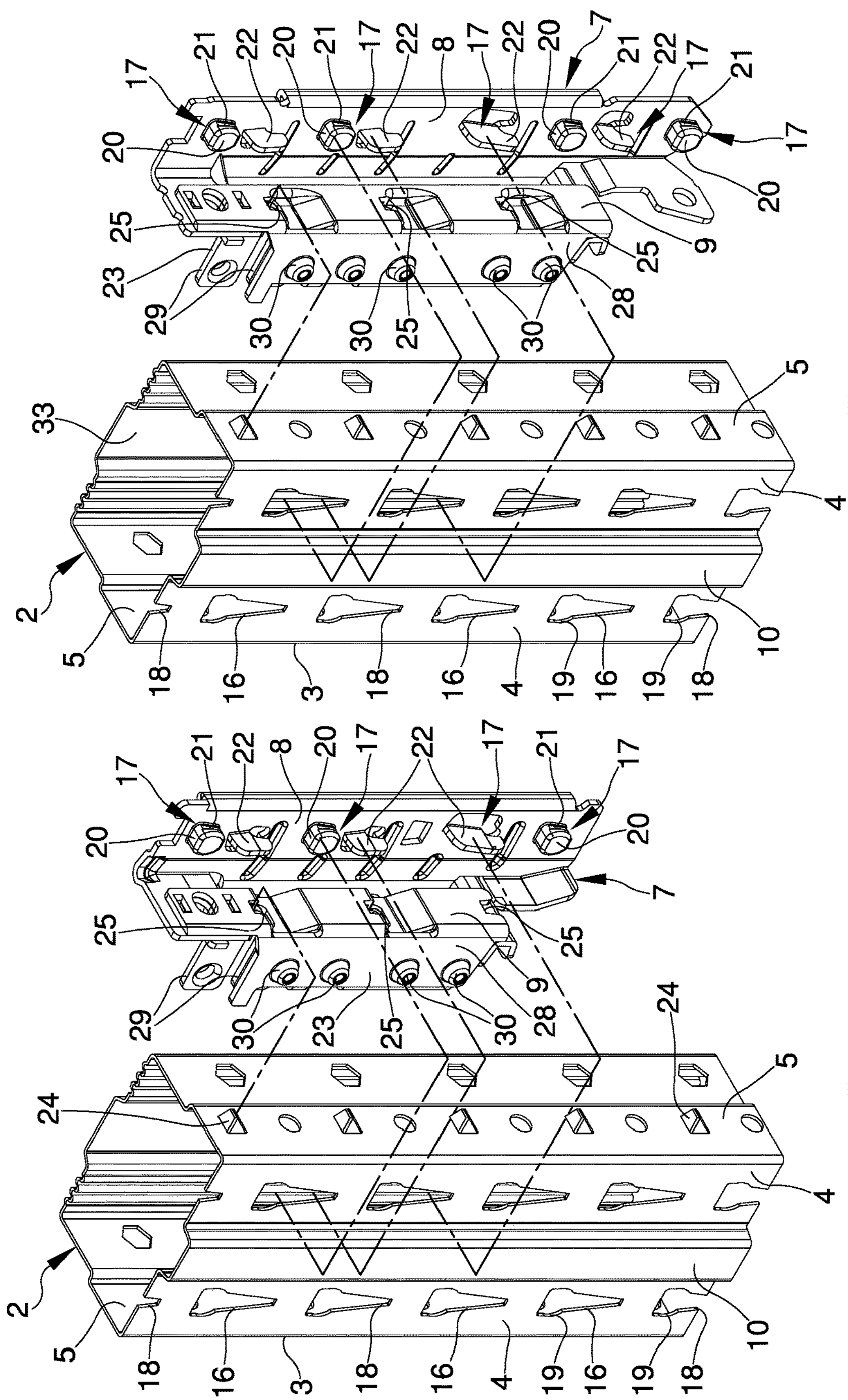
FIG. 9 is an axonometric view showing the coupling of the component of FIG. 2 with the upright of the bearing structure of FIG. 8.
FIG. 10 is an axonometric view showing the coupling of the component of FIG. 4 with the upright of the bearing structure of FIG. 8.

A second embodiment is shown in FIGS. 8, 9 and 10.

In this embodiment, the angular brackets 7 and the longitudinal cross-pieces 6 are substantially similar to the previously described embodiment, while the shape of the first metal section 3 is different.

Specifically, the first metal section 3 has a closed shape.

In fact, the vertical upright 2 comprises a longitudinal rear side 33 substantially opposed and parallel to the front side 10 and contiguous to the second longitudinal sides 5 to form a first metal section 3 with a substantially rectangular shape.

This way, excellent performance is obtained both in terms of resistance and deformation and good performance in case of accidental impact of the structure 1.

Moreover, in the second embodiment of FIGS. 8, 9 and 10 the shape of the first recesses 16 is the same as that of the embodiment of FIGS. 1, 6 and 7, while the clamping portions 24 are different.

In FIGS. 1, 6 and 7, in fact, the clamping portions 24 have a rounded shape, whereas in FIGS. 8, 9 and 10 they have a pointed shape.

Figure 11:
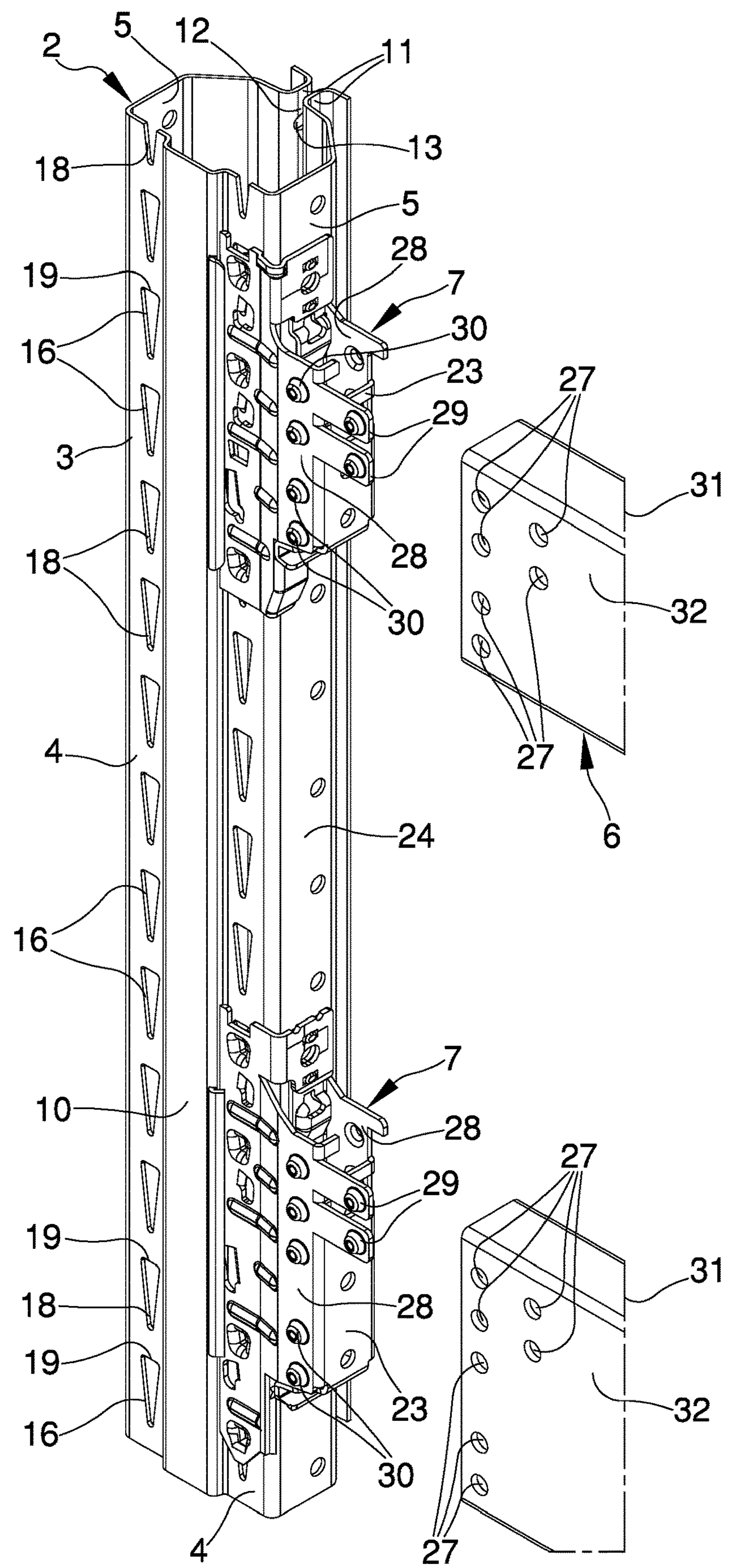
FIG. 11 is an axonometric view of a third embodiment of the bearing structure for shelving according to the invention.
Figure 13:
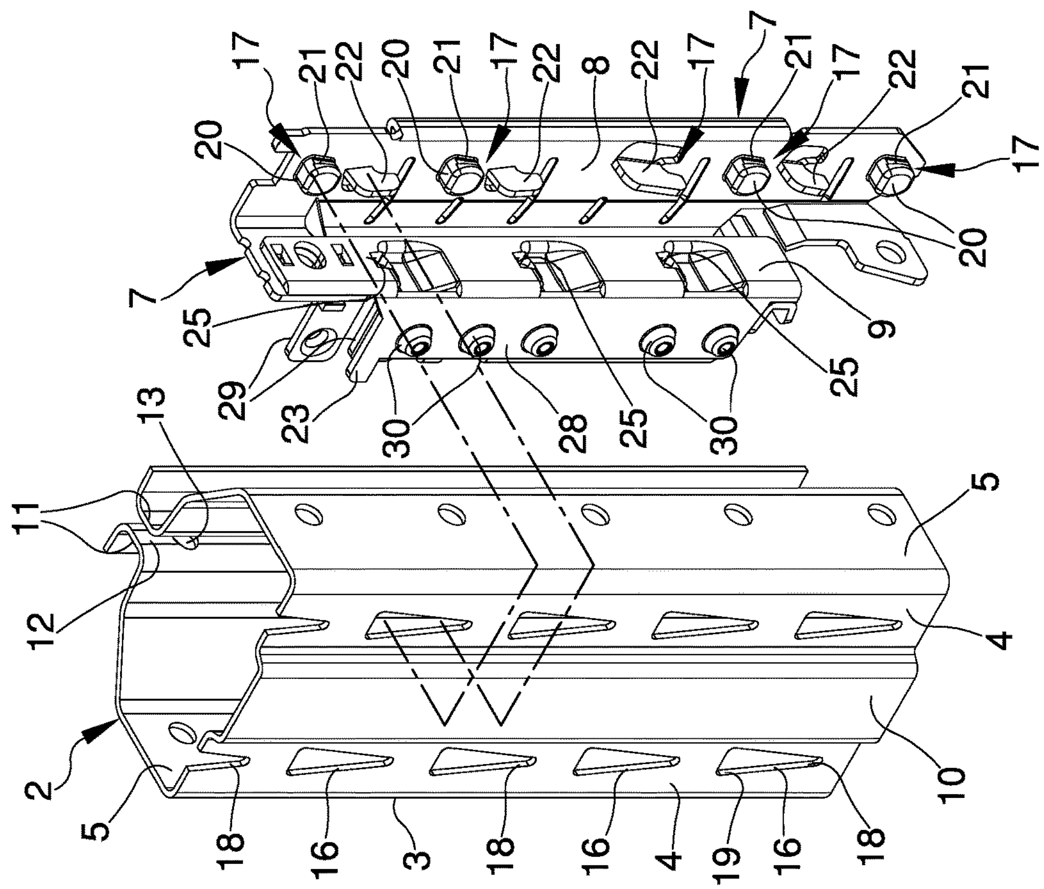
FIG. 13 is an axonometric view showing the coupling of the component of FIG. 4 with the upright of the bearing structure of FIG. 11.
Figure 12:
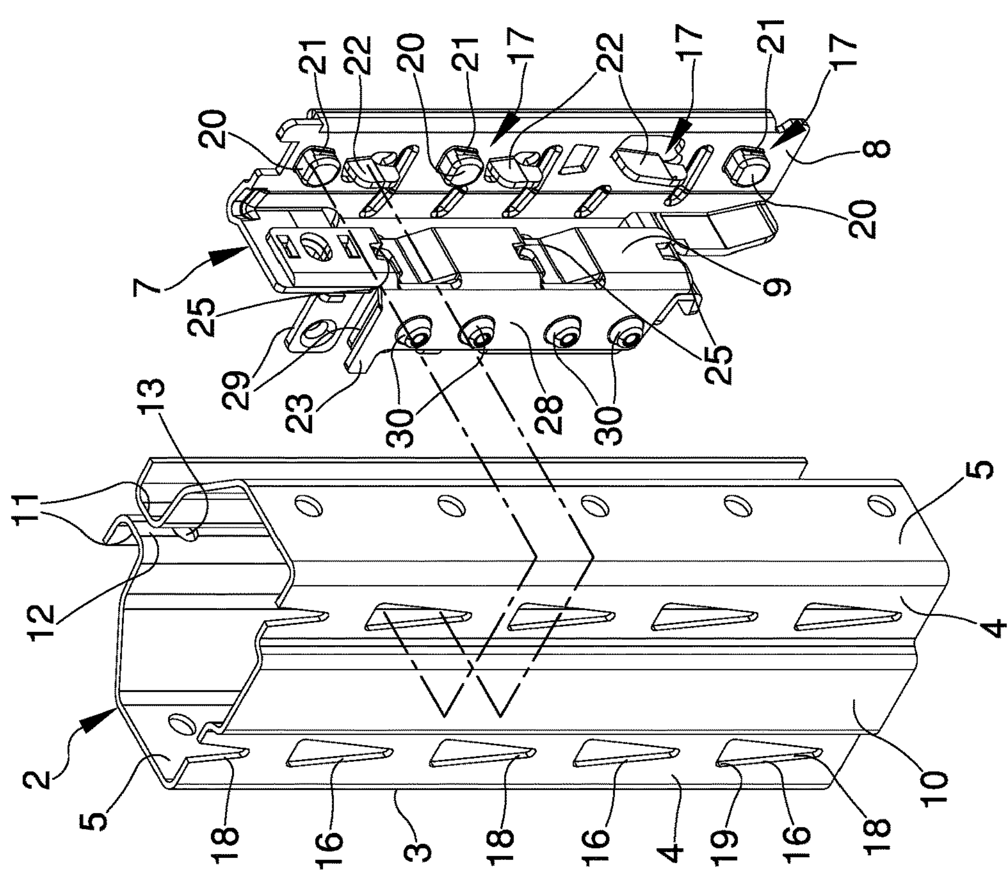
FIG. 12 is an axonometric view showing the coupling of the component of FIG. 2 with the upright of the bearing structure of FIG. 11.

A third embodiment is shown in FIGS. 11, 12 and 13.

This embodiment and its operation are substantially similar to the first embodiment described in FIGS. 1, 6 and 7 with the exception of the shape of the vertical upright 2.

In this embodiment, in fact, the first metal section 3 is substantially funnel-shaped wherein the third longitudinal sides 11 are spaced the one from the other by a substantially shorter distance than the first described embodiment Furthermore, the first recesses 16 are made in a strictly triangular shape, unlike the embodiments shown in FIGS. 1, 6, 7, 8, 9 and 10, wherein the expanded portions 19 of the first recesses 16 are slightly convex laterally.

Moreover, in this embodiment, the second connecting means 24, 25 do not comprise the clamping portions 24 but, rather, a portion of the second longitudinal side 5 which abuts against the second longitudinal face 9 to discharge the load to which the angular bracket 7 is subjected.

In fact, the particular funnel shape of the first metal section 3 allows simplifying the realization of the vertical upright 2 and allows, at the same time, making a particularly resistant bearing structure 1 able to support loads ranging from 7.5 to 15 tonnes.

It has in practice been found that the described invention achieves the intended objects.

In particular, the use of a pair of longitudinal sides and a pair of longitudinal faces to attach the angular bracket to the vertical upright makes it possible to obtain bearing structures able to support heavier and significantly more stable loads than known bearing structures.

Furthermore, the use of first attachment elements and second attachment elements, in conjunction with the use of the expanded portion and of the restricted portion, makes it possible to realize an attachment system between vertical upright and angular bracket able of suitably distribute the load to which the bearing structure is subjected.

Similarly, the clamping portions and the corresponding clamping seats also contribute to improve the flexibility and distribution of the load to which the bearing structure is subjected.

Advantageously, the use of the cold riveting process helps to realize an attachment system between the angular bracket and the longitudinal cross-piece which is both stable and aesthetically pleasing.

Moreover, the use of different embodiments of the vertical upright allows realizing particularly flexible bearing structures depending on the load to be supported.

The invention claimed is:

1. A bearing structure for shelving, comprising:

at least a vertical upright comprising at least a first metal section provided with at least a first longitudinal side and with at least a second longitudinal side, said first longitudinal side and said second longitudinal side being flat, continuous and transverse to each other;

at least a longitudinal cross-piece;

at least an angular bracket to be interposed between said vertical upright and said longitudinal cross-piece and comprising at least a first longitudinal face and at least a second longitudinal face, said first longitudinal face and said second longitudinal face being flat, contiguous and transverse to each other;

wherein said bearing structure comprises first connecting means arranged on said first longitudinal side and said first longitudinal face, and second connecting means, arranged on said second longitudinal side and said second longitudinal face, said first connecting means and said second connecting means coupling said angular bracket to said vertical upright;

wherein said first connecting means comprise a plurality of first recesses, formed on one of said first longitudinal side and said first longitudinal face, and a plurality of first attachment portions attachable to said first recesses and formed on the other of said first longitudinal side and said first longitudinal face;

wherein said first recesses comprise at least one expanded portion and at least one restricted portion, each of said plurality of first attachment portions being attachable to at least one of said expanded portion and said at least one restricted portion; and wherein at least one of said plurality of first attachment portions comprises at least a first attachment element attachable to said expanded portion.

2. The bearing structure for shelving according to claim 1, wherein at least one of said plurality of first attachment portions comprises at least a second attachment element attachable to said at least one restricted portion.

3. The bearing structure for shelving according to claim 1, wherein said second connecting means comprise a plurality of clamping portions, formed on one of said second longitudinal side and said second longitudinal face, and a plurality of clamping seats coupleable in support to said plurality of clamping portions and formed on the other of said second longitudinal side and said second longitudinal face.

4. The bearing structure for shelving according to claim 3, wherein said clamping seats are coupled in support to said plurality of clamping portions when said plurality of first attachment portions are attached to said first recesses.

5. The bearing structure for shelving according to claim 1, wherein said bearing structure comprises third connecting means to attach said angular bracket to said longitudinal cross-piece, comprising at least a second recess formed on one of said longitudinal cross-piece and said angular bracket, and at least a second attachment portion, attachable to said second recesses and formed on the other of said angular bracket and said longitudinal cross-piece.

6. The bearing structure for shelving according to claim 1, wherein said first metal section has an open shape defining a longitudinal opening such that the first metal section has a substantially C-shaped cross-section.

7. The bearing structure for shelving according to claim 1, wherein said first metal section has a closed shape such that it has contiguous cross-sectional perimeter.

* * * * *